(12) United States Patent
Dave et al.

(10) Patent No.: US 9,641,240 B2
(45) Date of Patent: *May 2, 2017

(54) TRANSFERRING DATA OVER BLUETOOTH USING INTERMEDIARY BRIDGE

(71) Applicant: Apple Inc., Cupertino, CA (US)

(72) Inventors: Swapnil R. Dave, Santa Clara, CA (US); Devrim Varoglu, Santa Clara, CA (US); Sarin S. Mehta, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/814,431

(22) Filed: Jul. 30, 2015

(65) Prior Publication Data
US 2016/0056884 A1    Feb. 25, 2016

Related U.S. Application Data

(63) Continuation of application No. 13/632,087, filed on Sep. 30, 2012, now Pat. No. 9,100,828.

(51) Int. Cl.
*H04B 7/26* (2006.01)
*H04W 8/00* (2009.01)
*H04W 12/08* (2009.01)
*H04W 8/20* (2009.01)
*H04W 84/18* (2009.01)

(52) U.S. Cl.
CPC .............. *H04B 7/26* (2013.01); *H04W 8/005* (2013.01); *H04W 8/20* (2013.01); *H04W 12/08* (2013.01); *H04W 84/18* (2013.01)

(58) Field of Classification Search
CPC ......... H04W 8/00; H04W 8/005; H04W 8/02; H04W 12/06; H04W 12/08; H04W 84/18; H04W 4/008; H04W 76/02; H04B 7/26; H04B 1/1036; H04B 5/0037; H04B 5/00
See application file for complete search history.

(56) References Cited

U.S. PATENT DOCUMENTS

| 7,039,033 | B2 | 5/2006 | Haller et al. |
| 7,203,505 | B1 | 4/2007 | Larikka et al. |
| 7,532,594 | B2 | 5/2009 | Lin et al. |
| 7,577,111 | B2 | 8/2009 | Yeung et al. |
| 8,132,236 | B2 * | 3/2012 | Hawkins ............... H04W 12/06 726/4 |
| 8,467,770 | B1 | 6/2013 | Ben Ayed |
| 2011/0065384 | A1 | 3/2011 | Cader et al. |

(Continued)

*Primary Examiner* — Thanh Le
(74) *Attorney, Agent, or Firm* — Downey Brand LLP

(57) ABSTRACT

In one or more embodiments, a first device such as a mobile phone can establish a wireless connection with second device, and the second device can act as a bridge between the first device and a peripheral device, such as a printer, so that the first device need not establish a secure pairing or other type of direct connection with the peripheral device. The second device provides a profile of the peripheral to the first device. The first device can then use the profile to access the peripheral device via the second device, with the second device passing data between the first device and the peripheral identified by the profile. This bridging feature simplifies the process of using the peripheral devices, since no secure pairing or other configuration procedure is needed to enable the first device to access the peripheral.

20 Claims, 5 Drawing Sheets

(56) References Cited

U.S. PATENT DOCUMENTS

| | | |
|---|---|---|
| 2011/0136434 A1 | 6/2011 | Choi |
| 2012/0057518 A1 | 3/2012 | Herrala et al. |
| 2013/0045681 A1 | 2/2013 | Dua |
| 2013/0078922 A1 | 3/2013 | Griffin et al. |
| 2015/0365817 A1* | 12/2015 | Chu ................ H04W 4/008 455/41.2 |

* cited by examiner

TRANSFERRING DATA OVER BLUETOOTH USING INTERMEDIARY BRIDGE

CROSS REFERENCE TO RELATED APPLICATIONS

This application is a continuation of U.S. patent application Ser. No. 13/632,087, filed on Sep. 30, 2012, the contents of which are incorporated by reference herein in its entirety.

TECHNICAL FIELD

The present invention relates generally to communication between computing devices. More particularly, the present embodiments relate to establishing connections and transferring data among devices using protocols such as Bluetooth®, WiFi™, and the like.

BACKGROUND

Portable computing devices have grown in popularity and capability. Early uses for portable computing devices were often limited to simple computing tasks such as number manipulation and word processing. Present applications can include advanced graphical rendering, musical composition, movie and music presentation, and more. Computing devices can communicate with other devices, such as peripherals, including printers, keyboards, headsets, and the like, using the Bluetooth® wireless communication protocol.

Bluetooth provides for wireless radio communication between two devices, and is widely supported by device vendors as a way to wirelessly transfer data between devices sold by different vendors. If a user wishes to use a peripheral device, such as a printer, via a Bluetooth connection using the ordinary Bluetooth protocol, the user is expected to set up a connection to the device by making the peripheral discoverable to the device and performing other setup tasks. For example, to configure a Bluetooth-compatible wireless headset for use with a mobile phone, a user performs several steps to "pair" the devices, such as placing the headset in a discovery mode, enabling Bluetooth on the phone, selecting a discovery feature on the phone, and selecting the desired device from a displayed list of available Bluetooth devices that are within communication range of the phone. A device password may also need to be supplied. A similar procedure can be used when establishing a connection between a phone and a printer or other devices. Other variations on this connection process are possible. Once the connection has been established, the information gathered from the user may be stored and used to automatically establish the connection in the future. Data can be sent from the phone to the device, and vice-versa, for the duration of the time that the phone is in communication range of the device, or until the wireless connection is terminated by one of the devices.

Bluetooth connections are one-to-one, i.e., from one device to one other device. Because of the one-to-one nature of the connections, devices communicate directly with each other, and users supply configuration information for each device. The process of setting up the connections can be time-consuming, and may involve asking users for setup information. Users may be asked to perform a series of steps to establish each connection. If a user wishes to connect to a device to which another user is connected, the user is not able to connect to the device until the other user disconnects.

Therefore, it would therefore be desirable to simplify the process of establishing connections and communication between Bluetooth devices.

SUMMARY

Computing devices use wireless communication via Bluetooth®, WiFi™, and the like to access peripheral devices that provide a multitude of features, such as hands-free headsets, keyboard input, document printing, audio output, and so on. However, using these peripheral devices can involve a time-consuming and difficult set up procedure in which the user may be expected to activate a special mode on the peripheral device and enter a security code on the computing device. Systems and methods are described herein that enable a computing device to act as a bridge between a user's computing device and a peripheral device, so that the computing device performs an initial set up procedure once to communicate with the bridging device, but need not perform any further set up procedures to use the peripheral devices. Using the peripheral devices is simpler and more convenient without the need to perform the peripheral device set up procedures. Thus, the bridge device performs the set up procedures to establish communication with the peripheral devices, and a trusted relationship is established between the user's computing device and the peripheral devices when the initial set up procedure performed. Subsequently, the user's computing device can access the bridging device quickly and conveniently with no need for further set up, and the bridging device forwards requests for peripheral features from the user's computing device to the peripheral device, thereby creating an appearance of the peripheral features being provided by the bridging device. The bridge device also forwards data from the peripheral device to the user's computing device. In this way, peripheral devices such as printers, speakers, keyboards, car kits, and the like that are available to the bridge device can be accessed from the user's computing device even though the user's computing device has not set up communications with the peripheral devices.

Thus, embodiments described herein simplify the use of Bluetooth or other wireless communication protocols to communicate with peripherals by using existing trust relationships with an intermediary device to enable the pairing operation to be performed without pairing or establishing a trust relationship between a user's device and the peripheral.

In one embodiment, a method for transferring Bluetooth® data from a first Bluetooth device to a second Bluetooth device is described. The method includes coupling an intermediary Bluetooth device to the second Bluetooth device, forwarding profile information describing the second Bluetooth device from the second Bluetooth device to the intermediary Bluetooth device, coupling the first Bluetooth device to the intermediary Bluetooth device and receiving the forwarded profile information at the first Bluetooth device, and transferring data from the first Bluetooth device through the intermediary Bluetooth device to the second Bluetooth device in response to the received forwarded profile information.

Embodiments may include one or more of the following features. The first and second Bluetooth devices may be paired as a result of a previous pairing operation, and coupling the first Bluetooth device to the intermediary Bluetooth device may further comprise establishing a trust relationship between the first and intermediary Bluetooth devices using security credentials generated by the previous pairing operation. Coupling the intermediary Bluetooth device to the second Bluetooth device may include pairing the intermediary Bluetooth device with the second Bluetooth device. Transferring the data from the first Bluetooth device through the intermediary Bluetooth device to the second Bluetooth device may be performed without a pairing existing between the first and second Bluetooth devices. The profile information may specify one or more capabilities of a Bluetooth device. The method may further include forwarding the profile information describing the second Bluetooth device from the intermediary Bluetooth device to the first Bluetooth device. The method may further include receiving, at the intermediary device, the profile information from the second device, the profile information describing one or more capabilities of the second device, and receiving the profile information from the second Bluetooth device, the profile information describing one or more capabilities of the second Bluetooth device, and storing, in a table of associations between Bluetooth devices and profiles in a memory of the intermediary device, the following: an association between the second Bluetooth device and the profile information received from the second Bluetooth device, and an indication that the association represents a remote device profile.

Forwarding the profile information may be in response to receiving a request from the first device for profiles of a requested type, and forwarding profile information may include selecting the profile information from the table of associations stored in the memory of the intermediary device, wherein the profile information is of the requested type, and sending the profile information to the first Bluetooth device.

Transferring data from the first Bluetooth device through the intermediary Bluetooth device to the second Bluetooth device may include receiving a request to transfer data between the first device and a device having one or more capabilities specified in the received profile information, searching the table of associations stored in the memory of the intermediary device for an entry that includes the received profile information, and transferring the data to the device associated with the received profile information by the entry in response to the entry including an indication that the association represents a remote device profile.

In another embodiment, a system for transferring data from a first device to a second device is provided. The system includes a processor configured to couple an intermediary device to the second device, forward profile information describing the second device from the second device to the intermediary device, couple the first device to the intermediary device, the first device configured to receive the forwarded profile information, and transfer, based upon the received forwarded profile information, data between the first device and the second device through the intermediary device.

Embodiments may include one or more of the following features. A trust relationship may exist between the first and second devices as a result of a previous key exchange, and coupling the first device to the intermediary device may include establishing a trust relationship between the first and intermediary devices using security credentials generated by the previous key exchange. Coupling the intermediary device to the second device may include performing a key exchange between the intermediary device and the second device. Data may be transferred from the first device through the intermediary device to the second device without a trust relationship existing between the first and second devices. The profile information from the second device may be received at the intermediary device. The profile information may describe one or more capabilities of the second device. The following may be stored in a table of associations between devices and profiles in a memory of the intermediary device: an association between the second device and the profile information received from the second device, and an indication that the association represents a remote device profile.

The profile information describing the second device may be forwarded from the intermediary device to the first device. Forwarding the profile information may be in response to receiving a request from the first device for profiles of a requested type. Forwarding the profile information may include selecting the profile information from the table of associations stored in the memory of the intermediary device, wherein the profile information is of the requested type, and send the profile information to the first device. Transferring data from the first device through the intermediary device to the second device may include receiving a request to transfer data between the first device and a device having one or more capabilities specified in the received profile information, searching the table of associations stored in the memory of the intermediary device for an entry that includes the received profile information, receiving the data from the first device at the intermediary device, and sending the data from the intermediary device to the device associated with the received profile information by the entry in response to the entry including an indication that the association represents a remote device profile.

In another embodiment, a non-transitory computer readable medium for a computer system is provided. The non-transitory computer readable medium has stored thereon computer program code executable by a processor to transfer data from a first device to a second device. The computer program code includes program code that causes the processor to operate as follows. Transferring data from a first device to a second device includes coupling an intermediary device to the second device, sending profile information describing the second device from the second device to the intermediary device, coupling the first device to the intermediary device, and transferring, based upon the received forwarded profile information, data between the first device and the second device through the intermediary device.

Embodiments may include one or more of the following features. Transferring data from a first device to a second device may further include receiving, at the intermediary device, the profile information from the second device, the profile information describing one or more capabilities of the second device, and storing, in a table of associations between devices and profiles in a memory of the intermediary device, the following: an association between the second device and the profile information received from the second device, and an indication that the association represents a remote device profile. Transferring data from a first device to a second device may further include forwarding the profile information describing the second device from the intermediary device to the first device, wherein forwarding the profile information is in response to receiving a request from the first device for profiles of a requested type, and the forwarding the profile information includes selecting the profile information from the table of associations stored in the memory of the intermediary device, wherein the profile information is of the requested type; and sending the profile information to the first device.

Transferring data from the first device through the intermediary device to the second device may include receiving a request to transfer data between the first device and a device having one or more capabilities specified in the received profile information; searching the table of associations stored in the memory of the intermediary device for an entry that includes the received profile information, receiving the data from the first device at the intermediary device, and sending the data from the intermediary device to the device associated with the received profile information by the entry in response to the entry including an indication that the association represents a remote device profile.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION

Figure 1:
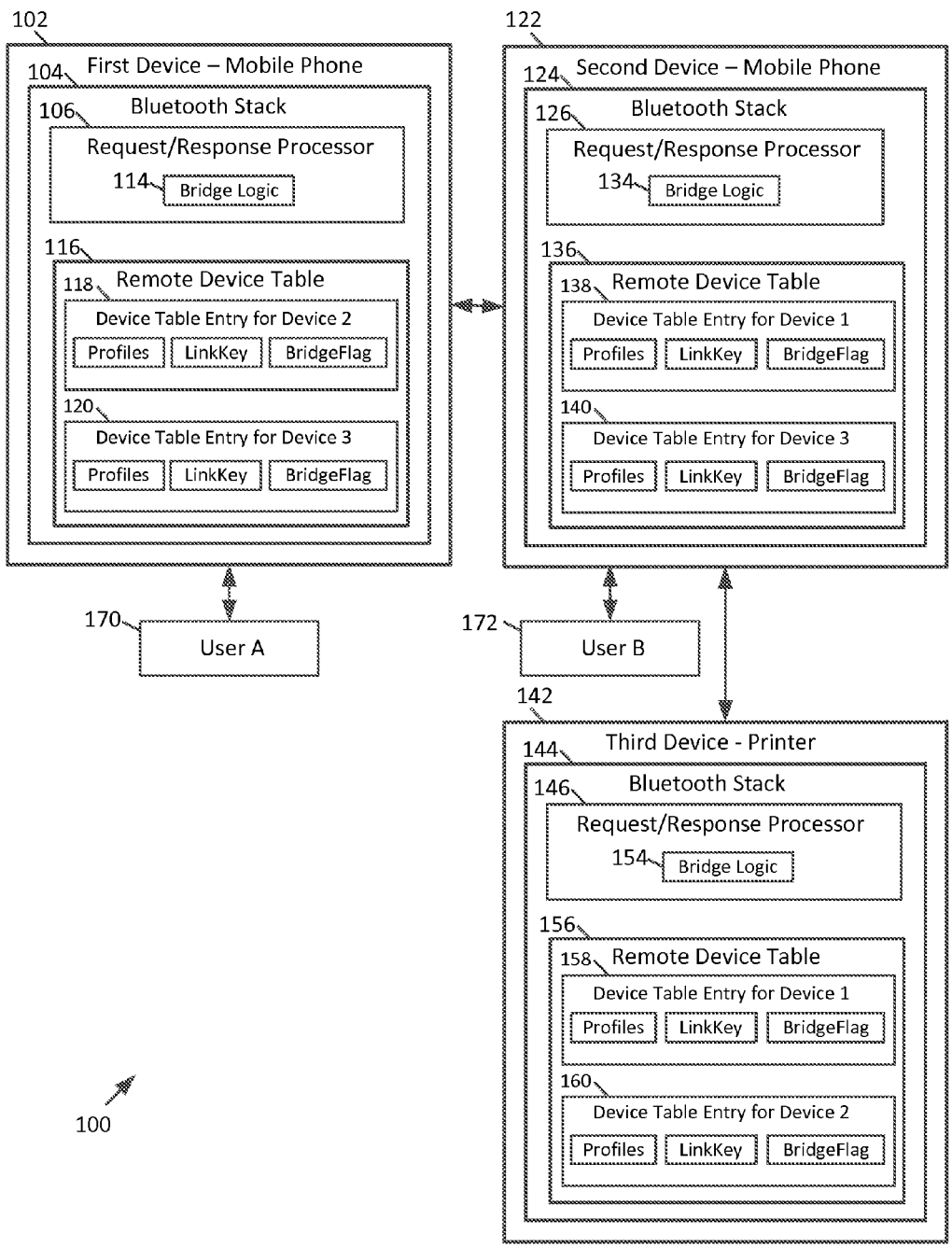
FIG. 1 is a representative diagram showing a wireless bridging system in accordance with one or more embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to a portable computing device such as a laptop computer, net book computer, tablet computer, etc. The portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The base portion can be formed of a multipart housing that can include top and bottom outer housing components each of which can be formed in a particular manner at an interface region such that the gap and offset between these outer housing components are not only reduced, but are also more consistent from device to device during the mass production of devices. These general subjects are set forth in greater detail below.

Computing devices use wireless communication via Bluetooth®, WiFi™, and the like to access peripheral devices that provide a multitude of features, such as hands-free headsets, keyboard input, document printing, audio output, and so on. However, using these peripheral devices can involve a time-consuming and difficult set up procedure in which the user may be expected to activate a special mode on the peripheral device and enter a security code on the computing device. Systems and methods are described herein that enable a computing device to act as a bridge between a user's computing device and a peripheral device, so that the computing device performs an initial set up procedure once to communicate with the bridging device, but need not perform any further set up procedures to use the peripheral devices. Using the peripheral devices is simpler and more convenient without the need to perform the peripheral device set up procedures. The bridging device performs the set up procedures to establish communication with the peripheral devices, and a trusted relationship is established between the user's computing device and the peripheral devices when the initial set up procedure performed. Subsequently, the user's computing device can access the bridging device quickly and conveniently with no need for further set up, and the bridging device forwards requests for peripheral features from the user's computing device to the peripheral device, thereby creating an appearance of the peripheral features being provided by the bridging device. The bridging device also forwards data from the peripheral device to the user's computing device. In this way, peripheral devices such as printers, speakers, keyboards, car kits, and the like that are available to the bridging device can be accessed from the user's computing device even though the user's computing device has not set up communications with the peripheral devices.

Thus, embodiments described herein simplify the use of Bluetooth or other wireless communication protocols to communicate with peripherals by using existing trust relationships with an intermediary device to enable the pairing operation to be performed without pairing or establishing a trust relationship between a user's device and the peripheral. For example, once a first user's Bluetooth device, e.g., a mobile phone, has been connected to or paired with a second user's Bluetooth device, e.g., another mobile phone, the first user's credentials are present on the second user's device. The credentials can be, for example, Bluetooth link keys. The first user's device can then send a request to the second user's device for access to a specified type of peripheral device such as a printer. If the second user's device has access to the specified type of peripheral device, then the second user's device sends a response indicating that the device is available. The first user's device can then send data to the peripheral device, such as documents to be printed, and the existing credentials between the first and second users' devices and the second user's devices and the peripheral devices are used to encrypt and transfer the data. This process is simpler for a user than the ordinary Bluetooth pairing process. In other examples, the other device can be a headset, a car kit, in which case a user of a requesting device can request that another device that is connected to a car kit via Bluetooth play music through the car kit.

FIG. 1 is a representative diagram showing a wireless bridging system 100 in accordance with one or more embodiments. Devices such as mobile phones, tablet computers, desktop computers, input and output peripherals, and so on, can communicate wirelessly via protocols such as Bluetooth®, WiFi™, and the like. In the case of Bluetooth®, two devices 102, 122 can be "paired" with each other to establish a communication connection that can be re-established without repeating the pairing process. The pairing process involves using a passcode or PIN known to both devices as an initialization key to perform a key exchange process that results in a shared secret link key being known to both devices. The devices are thus mutually authenticated as a result of the pairing operation, and data transfers between the two devices can be encrypted using the link key. Users are ordinarily expected to supply the passcode or PIN when the pairing operation in performed, so pairing two devices can be time consuming because the user needs to recall or find the passcode, place the devices in an appropriate mode for pairing, and enter the passcode on at least one of the devices. Embodiments described herein simplify the use of Bluetooth or other wireless communication protocols to communicate with peripherals by using existing trust relationships with intermediary devices to enable the pairing operation to be performed without pairing or establishing a trust relationship between a user's device and the peripheral.

In one or more embodiments, a first device 102, such as a mobile phone belonging to a user A 170, can be paired with a second device 122, such as a second mobile phone that belongs to a user B 172, and data can then be transferred between the two devices via a protocol such as Bluetooth. Since the first device 102 has been paired with the second device 122, a shared secret key is stored on the first and second devices. In another example, as a result of pairing, credentials of the first device 102 are stored on the second device 122, and vice versa. In this example, the pairing process can involve a user of the first device entering a passcode or password on the first device 102, and the first and second devices communicating so that the second device 122 can verify that the first device 102 has an authentic passcode, thereby establishing a trust relationship in which the second device 122 trusts the first device 102. As a result of the pairing process, each mobile device 102, 122 creates an entry that represents the other device in a remote device table 116, 136. Each remote device table 116 represents Bluetooth devices or features of Bluetooth devices that have been discovered or otherwise become known to the device 102. Each entry 118 in the remote device table 116 represents one remote device, and includes one or more hardware profiles that represent the features provided by the remote device. Each entry 118 also includes a link key, which can be a shared secret, credentials of the remote device, or other authentication data. A bridge flag can also included in each entry 118 to indicate whether the device 102 performs bridging for the remote device represented by the entry 118. The bridge flag can be set by, for example, an administrative user interface, or as a configuration parameter, or based on runtime information, or in some other way. The bridge flag is set to true in the examples described herein unless otherwise noted.

Thus, the pairing of the first and second devices 102, 122 results in the first device 102 creating a device table entry 118, representing the second device 122, in the remote device table 116, and storing the shared secret as the LinkKey in the device table entry 118. In other embodiments, the LinkKey can be a value derived from the shared secret, credentials of the other device, or some other authentication information. Similarly, the second device 122 creates a device table entry 138 in the remote device table 136 representing the first device 102, and stores the shared secret or other authentication data in a LinkKey entry in the device table entry 138.

Furthermore, as part of the pairing process, or subsequently, one or both of the devices stores a profile of the other device in their device table entry 118, 138 for the other device. If a third device 142, e.g., a printer, has previously been paired with the second device 122, then a profile representing the third device 142 is present in a device table entry 143 for the third device in the second device's remote device table 136. Therefore, when the first and second devices are paired, or subsequently, the devices perform a discovery process in which one or both of the devices discover the profiles of the hardware features provided by the other device. When the discovery process is performed, the second device 122 sends a list of the profiles in the remote device table 136 that are associated with a bridge flag value of true. In this example, the second device 122 sends the device table entry for device 3 to the first device 102, and the first device 102 creates a device table entry 120 for device 3. The first device 102 can now use the profiles included in the device table entry 120 for device 3 to request printing services from the third device 142 by sending a request to the second device In one example, the device table entry 120 can include the identity of third device n the profiles, and also includes an indication that the profiles were received from the second device 122, so that requests using the profiles in the device table entry 120 are sent to the second device 122 instead of the third device 142. In another example, the device table entry 120 includes the identity of the second device 122 in the profiles, and does not indicate that the profile features are actually provided by the third device 142. In this example, when the first device 102 sends a request to the second device 122 using the profiles in the device table entry 120, the second device 122 recognizers that the profile is for a feature of the third device 142, and forwards the request to the third device 142.

Once the second device 124 (user B's phone) has been paired with a third device 142, e.g., a wireless printer, User A 170 can use the first device 102 to print a document on the printer 142. Using the ordinary Bluetooth protocol, user A 170 would pair their device 102 (A's phone) directly with the printer 142 in a one-to-one pairing. Pairing A's phone 102 with the printer would involve User A 170 configuring the phone 102 to communicate with the printer 142, and making sure the printer is discoverable by the phone, which can be a relatively time-consuming process. Instead, since User B's second device 122 is already paired with the printer 142, User A's first device 102 can access the printer 142 by using the second device 122 as an intermediary, i.e., a bridge. Since the first device 102 is already connected (i.e., paired) to the second device 122 (B's phone), the first device can send a query to the second device requesting information about available printers instead of initiating the pairing process. If the second device acknowledges and indicates that a suitable printer (e.g., the third device) is available to print the document, then the first device can send the document to the second device via the Bluetooth protocol using the existing pairing with the second device, and the second device can send the document to the printer using the existing pairing with the printer.

As introduced above, in one or more embodiments, the second device 122 indicates which hardware capabilities are available through it by sending one or more profiles conforming to a Bluetooth General Access Profile (GAP) format to the first device 102. The profiles describe the capabilities of the second device 122 as well as the capabilities of devices paired with the second device, such as the third device 142. For example, if the second device 122 is paired with a printer 142, the second device's response to discovery requests from the first device 102 can be an acknowledgement that includes a profile for image printing named BIP, and a profile for page printing named PP (which are subcategories of the GAP). Upon receiving the acknowledgment, the first device 102 can uses the printing profiles to add printer device entries to a list of available Bluetooth devices, such as the remote device table 116. User A 170 can then select the image printer or the page printer when printing a document or image, and the first device 102 can send the document or image to the second device 122 via Bluetooth. The second device 122 receives the image or document and sends it to the printer 142 via Bluetooth. The second device 122 thus acts as a bridge between the first device 102 and the printer 142, thereby enabling the connection between User A's first device 102 and the printer 142 to be established quickly and conveniently, without performing a pairing operation between the first device and the printer.

The intermediary bridge device, e.g., the second device 122, can selectively expose its capabilities to the requesting device. For example, a profile (or device) can be marked as not sharable, in which case the profile (or all of the device's profiles) is not provided to requesting devices. The communication paths to and from the bridge 122 can be established dynamically and are not restricted by pre-existing communication connections. In one aspect, the bridge 122 acts as an intelligent hub that has the drivers and the wireless protocols used to create the links between the requesting device 102 and the peripheral device 142 so that the bridge 122 can act as a hub. Note that although the device 142 is described as a peripheral device, it can be understood as a third device, which can be any type of device that communicates via Bluetooth or other protocol and provides profiles describing its capabilities. Other protocols can be used instead of or in addition to Bluetooth for communication between the devices 102, 122, 142, such as other wireless or wired communication technologies. For example, the connection between the first and second devices 102, 122 can be a WiFi or P2P connection, and the connection between the second device 122 and the third device 142 can be a Bluetooth connections. The bridge 122 can act as a multi-protocol hub that can receive requests via the Bluetooth protocol, and send the requests to other devices via WiFi.

In one or more embodiments, when a first device 102 is paired with a second device 122, a connection is initiated, and a link key, i.e., as shared secret code, is created and stored on the devices. The next time a connection is established by a handshake between the two devices 102, 122, the previously established link key is used, instead of establishing a new key. Thus, after User A's device 102 has been paired with User B's device 122, User A's link key is present on user B's device in a device table entry 136 for device 1, so B's device 122 trusts A's device 102. Then, when User A's device 102 again requests a connection to User B's device 122, if both devices agree that the link key is valid, a connection is established without performing the full handshake (e.g., pairing or key exchange) involved in establishing a new link key. Subsequently, transactions between the two devices 102, 122 are encrypted using the link key (e.g., using 128-bit encryption). A link key can similarly be established between other devices, such as the second device 122 and the third device 142.

As introduced above, in one or more embodiments, a Generic Access Profile (GAP) enables access to characteristics of a device. A first device 102 can request information about characteristics or capabilities of a second device 122 prior to establishing a wireless network connection with the second device 122. The capabilities can be represented as profiles, which can be transferred between devices via the network and stored in a device table 116, e.g., on the first device 102 in a device table entry 118 for the second device 122. The capabilities may be, for example, playing music files, printing documents, using keyboards, and so on. These capabilities can be provided by other devices 142, e.g., peripherals such as printers, keyboards, monitors, speakers, and the like, which can be wirelessly connected to the second device. The first device 102 can receive a list of the capabilities provided by the second device 122 by requesting the second device's profiles. The capabilities that the second device 122 "advertises" as being available can be provided by the second device itself or by peripheral devices that are also wirelessly connected to the second device 122 and for which the second device 122 act as a bridge. Thus, in response to a request for capability information, the second device 122 sends a list of the profiles that it supports itself, as well as the profiles of other devices 142 for which the second device 122 acts as a bridge. The second device generates this list of protocols by retrieving entries from a local capability table (not shown) in which the profiles supported by the second device itself are stored, and also retrieving entries from the remote device table 136, in which profiles supported by other devices connected to or accessible to the second device 122, such as the third device 142, are stored. The profiles can be, for example, page printing, music playing, and so on. The capability information is exchanged between the devices in a data format defined b the Generic Access Profile (GAP). For example, there is a profile for image printing named BIP, and a profile for page printing named PP, which are subcategories of the GAP.

In one or more embodiments, access restrictions can be associated with the capabilities that are known to the intermediary device, e.g., the profiles listed in the remote device table 136, can be selectively filtered so that certain devices are presented to requesting devices 102, and other devices are not presented. The devices that are presented can be determined based upon security policies or access control lists, for example. The devices that are presented can also be determined based on the identity of the requesting device 102 and/or the identity of the User A 170 associated with the requesting device. Thus, for example, a server table entry 138 can be associated with particular users, user groups, access roles, devices, or the like, that are permitted to access the profile(s) in the server table entry 138. Access control can be performed by sending only profiles for which the requesting device or user has permission according to the access control information associated with the profiles in the remote device table 136.

Figure 2:
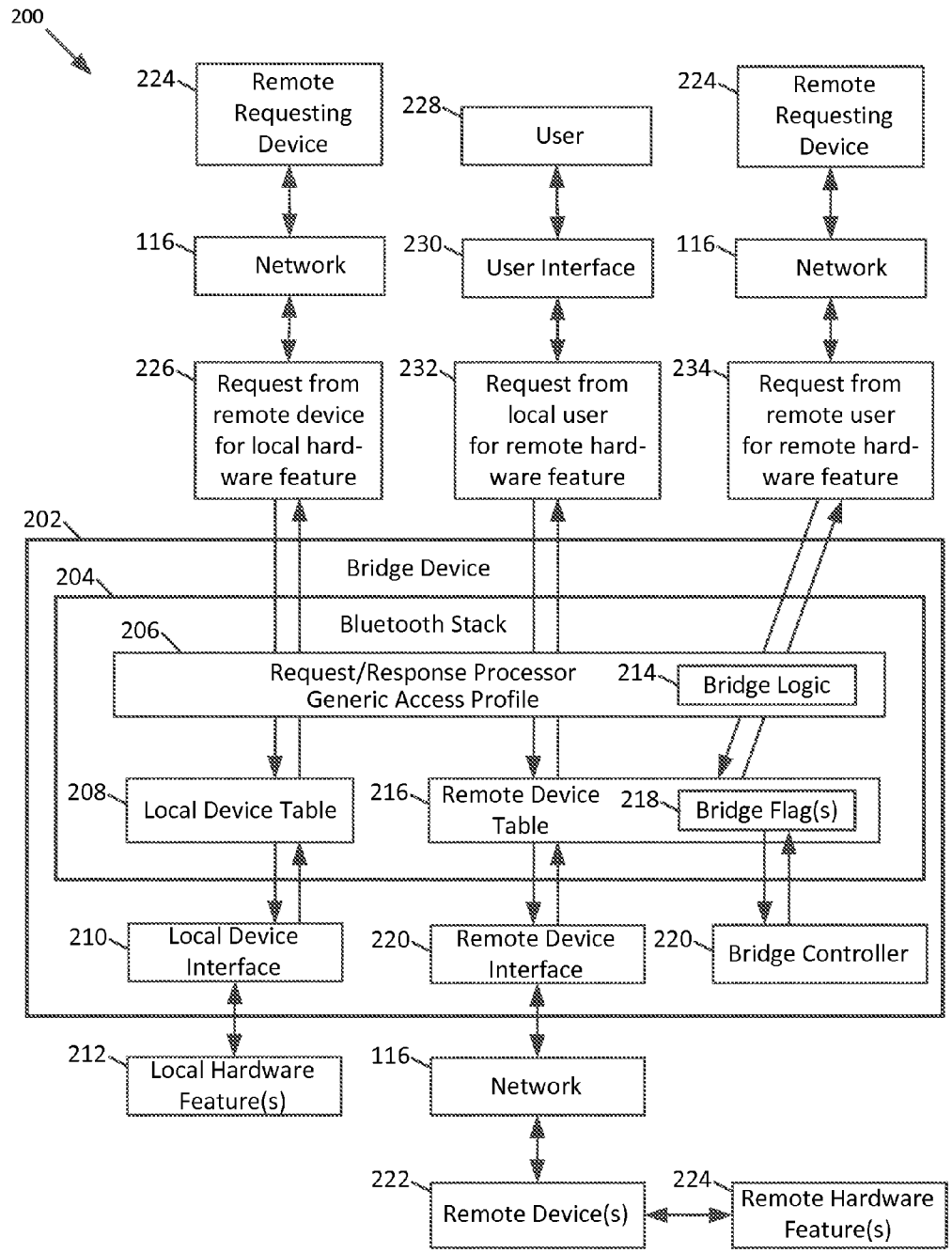
FIG. 2 is a representative diagram showing a bridging device in accordance with one or more embodiments.

FIG. 2 is a representative diagram showing a bridging device 202 in accordance with one or more embodiments. The bridging device 202 corresponds to the second device 122 of FIG. 1 and includes a Bluetooth stack 204, which provides wireless network communication and Bluetooth features such as device discovery, pairing, profiles, and so on. A request/response processor 206 generates outgoing messages and data to be sent via the network, and receives incoming messages and data from the network according to the Generic Access Profile and other Bluetooth communication protocols. Bridge Logic 214 is shown as a component of the request/response processor 206, although the Bridge Logic 214 can alternatively be external to the request/response processor 206, communicating with the processor 206 via, for example, a programming interface. The Bridge Logic 214 is invoked by the request/response processor 206 when requests 234 for remote hardware features (i.e., profiles located on other devices 142) are received. In other embodiments, the Bridge Logic 214 can be invoked for each message received by the Bluetooth stack 204, in which case the Bridge Logic 214 selectively identifies and processes requests 234 from remote users for remote hardware features. The Bridge Logic 214 processes requests 234 for remote hardware features. The requests 234 may include data to be provided as input to the remote hardware features and are received via a network 116 from a user of a remote requesting device 224. The Bridge Logic 214 queries the remote device table 216 for an entry 138 having a profile matching the profile requested in the received request 234. If an entry 138 having a matching profile (e.g., a profile that is the same as or equivalent to the requested profile) is found, then the Bridge Logic 214 forwards the request to the remote device 222 associated with the entry 138. The remote device 222 receives the request, performs the requested operation using remote hardware features 224, and sends results (if any) back to the bridging device 202. The bridge logic 214 receives the results and forwards them to the remote requesting device 224. In this way, the Bridge Logic 214 bridges communications between a remote requesting device 224 and a remote target device 222.

In one or embodiments, the Bluetooth stack 204 continues to process ordinary Bluetooth requests, such as a request 226 from a remote device for local hardware features of the bridging device 202 received via the network 116. Requests 224 for local features can be processed by querying a local device table 208 for a profile that matches or satisfies the request 226. If a matching profile is found, the request/response processor 206 passes the request 224 to a local device interface 210 to perform the requested operation using a local hardware feature 212, and any results are returned to the remote requesting device 224. The Bluetooth stack also continues to process requests from local users for remote hardware features, e.g., requests 232 from a user 228 of the bridging device 202 via a user interface 230 to use a remote Bluetooth printer 144. Such requests 232 can be processed by the request/response processor 206, which queries the remote device table 216 for a device having the requested profile, and sends the request to the remote target device 222 having the matching profile via the network 116.

In one or more embodiments, the bridging device 202 creates and updates the remote device table 216 by storing remote device table entries in the table 216 for each remote device discovered by a discovery process performed by the Bluetooth Stack 204. Each remote device table entry includes a bridge field 218, which can be set to true to cause the bridging device 202 to bridge communications for the profiles listed in that device table entry. If the bridge field 218 is set to false, the bridging device 202 does not bridge communications for the profile(s) listed in the device table entry, and does not include those profile(s) in responses to discovery messages or other requests received from remote requesting devices 224. A bridge controller 220 sets the value of the bridge fields 218 in response to user input or other configuration information. A user interface, such as an administrative control interface, can use the bridge controller 220 to enable and disable bridging for particular devices or profiles by the bridging device 202.

Figure 3:
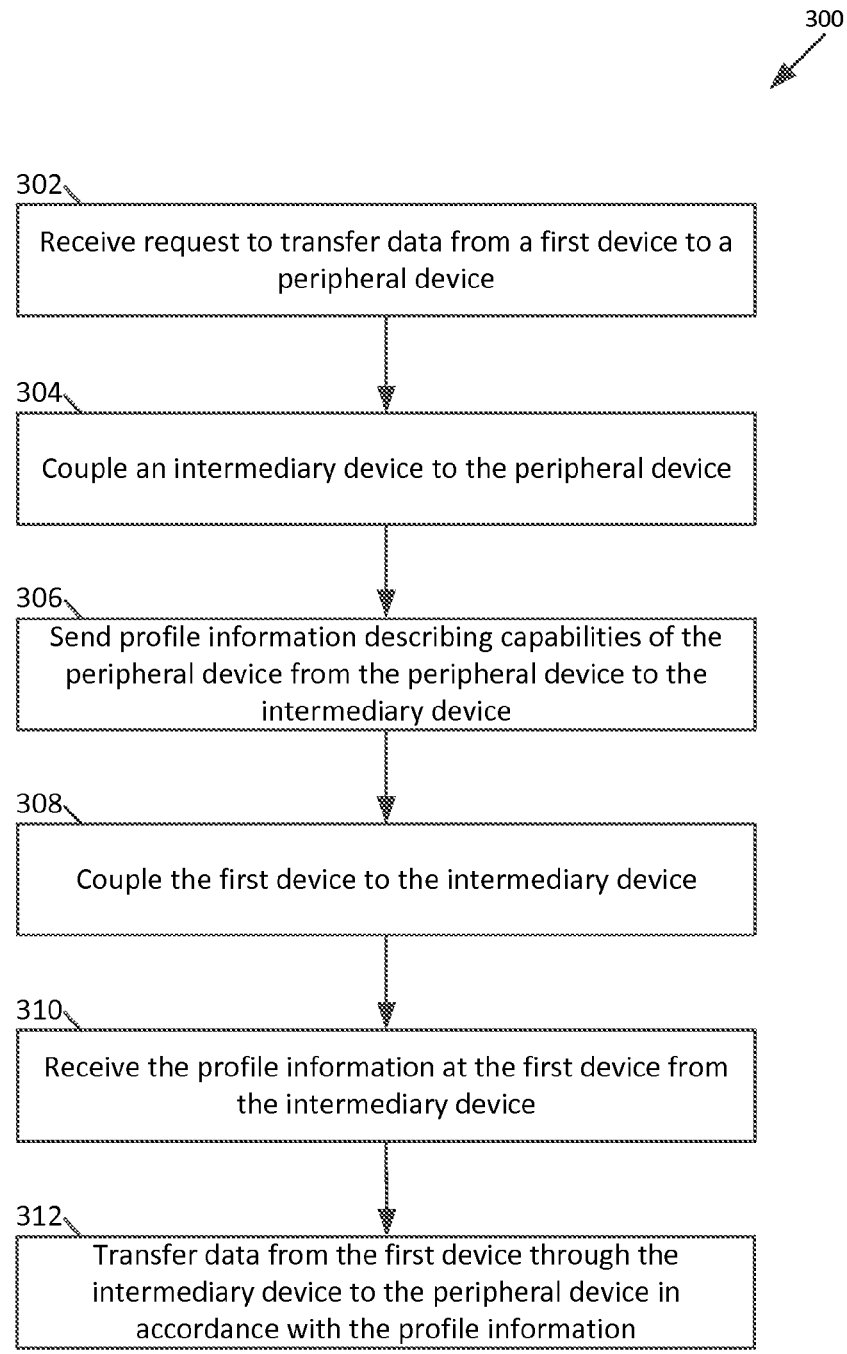
FIG. 3 illustrates a process of bridging data between first and second devices using an intermediary bridge device in accordance with one or more embodiments.

FIG. 3 illustrates a process of bridging data between first and second devices using an intermediary bridge device in accordance with one or more embodiments. Process 300 can represent the Bridge Logic 214 of FIG. 2 and can be implemented as, for example, computer program code encoded on a computer readable medium and executable by a processor of a computer system. Process 300 can be invoked by a Bluetooth stack 204 when, for example, data is received at a Bluetooth device 122. The process begins at block 302 when the device 122 receives a request to transfer data from a first device 102 to a peripheral device 142. Block 304 couples, i.e., pairs or connects, an intermediary device 122 to the peripheral device 142. Block 306 sends profile information describing capabilities of the peripheral device 142 from the peripheral device to the intermediary device 122. Block 308 couples the first device 102 to the intermediary device 122. Block 310 receives the information at the first device 102 from the intermediary device 122. Block 312 transfers data from the first device 102 through the intermediary device 122 to the peripheral device 142 in accordance with the profile information. For example, the intermediary device 122 receives data directed at the profile from the first device 102, identifies the location of the profile as being the peripheral device 142, and sends the data to the peripheral device 142 using the profile. The peripheral device 142 can send response data to the intermediary device 122, which forwards the response data to the first device 102. Thus, in one or more embodiments, the first and second devices can be any Bluetooth devices that communicate with the intermediary device using ordinary Bluetooth protocols that do not have bridging features. The intermediary device can also use ordinary Bluetooth protocols, except that the intermediary device advertises profiles of remote devices and transfers data directed to profiles of remote devices between requesting devices and the remote devices.

Figure 4:
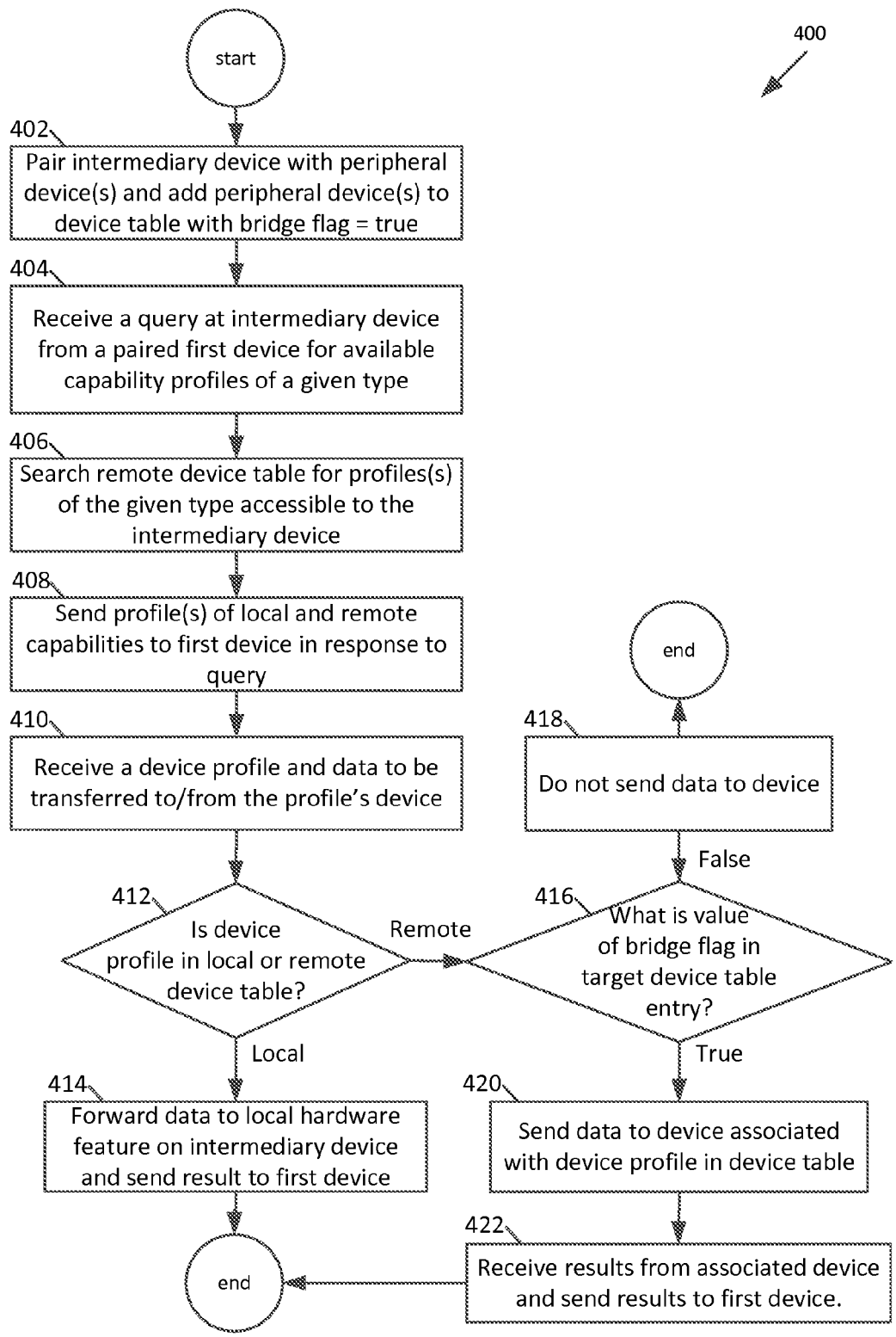
FIG. 4 illustrates a data bridging process to be executed by an intermediary device in accordance with one or more embodiments.

FIG. 4 illustrates a data bridging process 400 to be executed by an intermediary device in accordance with one or more embodiments. Portions of process 400 can represent the Bridge Controller 220 and the Bridge Logic 214 of FIG. 2, and can be implemented as, for example, computer program code encoded on a computer readable medium and executable by a processor of a computer system. Block 402 can be invoked when a user initiates a pairing operation to pair an intermediary device with a peripheral device. Block 402 sets the bridge flag value in the device table of the intermediary device to true. The bridge flag value can be set by, for example, the Bridge Controller 220. Block 404 can be invoked by the Bridge Logic 214 when a query for available devices of a given type is received at the intermediary device 122. The query may be, for example, a discovery request. The query may be received from a first device 102 that is paired with the intermediary device. Block 406 searches the remote device table 216, which is stored in a memory of the intermediary device 122, for profiles of the given type that are accessible to the intermediary device 122. Block 408 sends any located profiles for local and/or remote capabilities matching the query to the first device 102 as a response to the query. Block 410 receives a device profile and data to be transferred to or from one of the located device profiles. Block 412 determines whether the received device profile is in the local device table 208 or in the remote device table 216. If the device profile is in the local device table 208, then block 414 sends the data to the corresponding local hardware feature on the intermediary device 122. The local hardware feature can be identified using the profile. Block 414 then sends the results back to the first device 102.

If the device profile is present in the remote device table, block 416 retrieves the value of the bridge flag from the device table entry 138 associated with the received device profile in the remote device table 216. If block 416 determines that the bridge flag is true, then block 420 sends the data received at block 410 to the device associated with the device profile in the remote device table 216, with an indication that the data is for the particular device profile. Block 422 then receives results from the device associated with the protocol, sends the results back to the first device 102, and the process ends. Otherwise, if block 416 determined that the bridge flag is false, then the data is not sent to the peripheral device, and the process ends.

Figure 5:
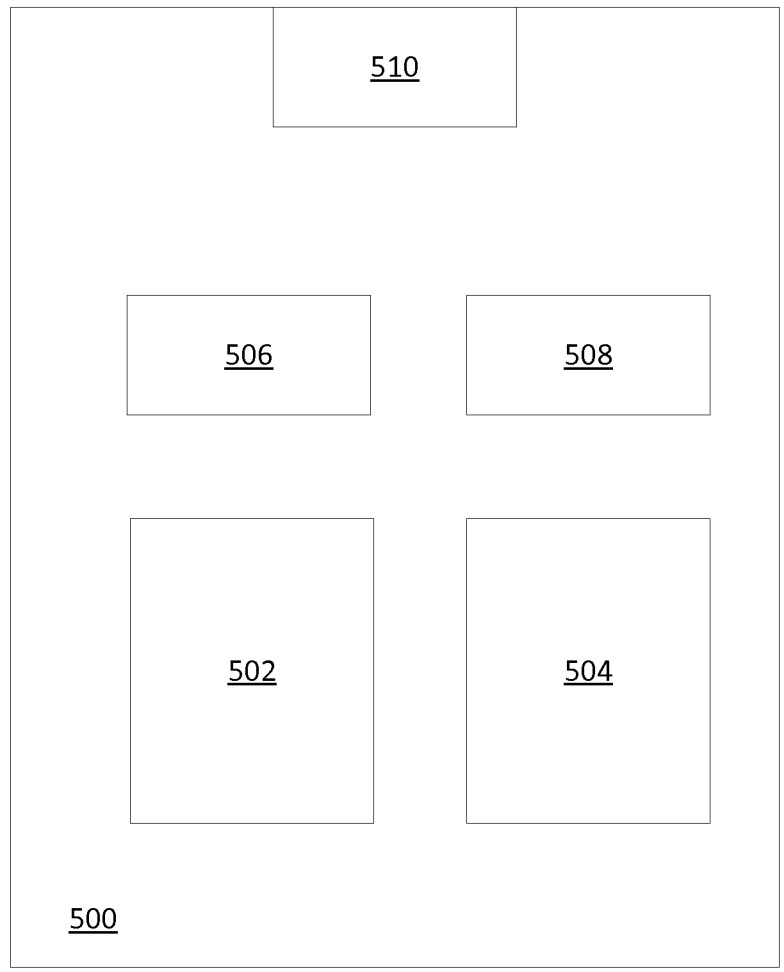
FIG. 5 shows a system block diagram of computer system used to execute the software of an embodiment.

FIG. 5 shows a system block diagram of computer system 500 used to execute the software of an embodiment. Computer system 500 includes subsystems such as a central processor 502, system memory 504, fixed storage 506 (e.g., hard drive), removable storage 508 (e.g., FLASH), and network interface 510. The central processor 502, for example, can execute computer program code (e.g., an operating system) to implement the invention. An operating system is normally, but necessarily) resident in the system memory 504 during its execution. Other computer systems suitable for use with the invention may include additional or fewer subsystems. For example, another computer system could include more than one processor 502 (i.e., a multi-processor system) or a cache memory.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method for data transfer, the method comprising:
by an intermediary wireless device:
requesting, from a first wireless device via a first wireless connection established between the intermediary wireless device and the first wireless device, profile information identifying one or more capabilities of the first wireless device, the one or more capabilities including non-communication services associated with the first wireless device, wherein the non-communication services are different than authentication services;
receiving, from the first wireless device via the first wireless connection, the profile information;
establishing a second wireless connection between the intermediary wireless device and a second wireless device; and
transferring, based at least in part on the profile information, data between the first wireless device and the second wireless device via the first wireless connection and the second wireless connection, wherein the data corresponds to at least one of the non-communication services.

2. The method of claim 1, further comprising:
by the intermediary wireless device:
storing, in a table of associations between devices and profiles, an association between the first wireless device and the profile information received from the first wireless device.

3. The method of claim 2, further comprising:
by the intermediary wireless device:
storing, in the table of associations between devices and profiles, an indication that the profile information represents profile information for a remote device.

4. The method of claim 2, further comprising:
by the intermediary wireless device:
storing, in the table of associations between devices and profiles, an indication of a security policy and/or an access control list associated with the first wireless device.

5. The method of claim 4, further comprising:
by the intermediary wireless device:
receiving a request for a device capability from the second wireless device, the device capability corresponding to a non-communication service of the non-communication services; and
providing an indication of availability of the device capability to the second wireless device when (i) the device capability is available from the first wireless device and (ii) the security policy and/or the access control list associated with the first wireless device indicates that the second wireless device is permitted access to the device capability and/or to the first wireless device.

6. The method of claim 4, further comprising:
by the intermediary wireless device:
receiving a request for a device capability from the second wireless device, the device capability corresponding to a non-communication service of the non-communication services; and
providing an indication of availability of the device capability to the second wireless device when (i) the device capability is available from the intermediary wireless device and (ii) the security policy and/or the access control list associated with the first wireless device indicates that the second wireless device is not permitted access to the device capability and/or to the first wireless device.

7. The method of claim 1, further comprising:
by the intermediary wireless device:
using security credentials generated during a previous pairing operation between the first wireless device and the second wireless device in establishing the second wireless connection between the intermediary wireless device and the second wireless device.

8. The method of claim 1, further comprising:
by the intermediary wireless device:
establishing the first wireless connection between the intermediary wireless device and the first wireless device by at least pairing the intermediary wireless device with the first wireless device.

9. The method of claim 1, further comprising:
by the intermediary wireless device:
transferring the data between the first wireless device and the second wireless device without directly pairing the first wireless device and the second wireless device.

10. The method of claim 1, further comprising:
by the intermediary wireless device:
receiving a request from the second wireless device for a device capability, the device capability including a non-communication service of the non-communication services; and
selecting the first wireless device to provide the device capability for the second wireless device, when the profile information received from the first wireless device identifies the device capability.

11. The method of claim 1, wherein the profile information conforms to a Bluetooth General Access Profile (GAP) format.

12. The method of claim 1, further comprising:
by the intermediary wireless device:
sending, to the second wireless device, device capability information including at least one device capability identified by the first wireless device, the device capability including the non-communication services.

13. The method of claim 1, wherein the first wireless connection comprises a Wi-Fi connection or a peer-to-peer (P2P) wireless local area network (WLAN) connection, and the second wireless connection comprises a Bluetooth connection.

14. An intermediary wireless device comprising:
a first wireless interface and a second wireless interface; and
a processor configured to cause the intermediary wireless device to:
request, from a first wireless device via a first wireless connection established between the intermediary wireless device and the first wireless device, profile information identifying one or more capabilities of the first wireless device, the one or more capabilities including non-communication services associated with the first wireless device, wherein the non-communication services are different than authentication services;
receive, from the first wireless device via the first wireless connection, the profile information;
establish a second wireless connection between the intermediary wireless device and a second wireless device using the second wireless interface; and
transfer, based at least in part on the profile information, data between the first wireless device and the second wireless device via the first wireless connection and via the second wireless connection, wherein the data corresponds to at least one of the non-communication services.

15. The intermediary wireless device of claim 14, wherein the processor is further configured to cause the intermediary wireless device to transfer the data from the second wireless device through the intermediary wireless device to the first wireless device via the first wireless connection and the second wireless connection when the first wireless device and the second wireless device are not directly paired.

16. The intermediary wireless device of claim 14, wherein the processor is further configured to cause the intermediary wireless device to:
receive a request from the second wireless device for a device capability, the device capability corresponding to a non-communication service of the non-communication services; and
select the first wireless device to provide the device capability for the second wireless device, when the profile information received from the first wireless device identifies the device capability.

17. The intermediary wireless device of claim 16, wherein the processor is further configured to cause the intermediary wireless device to:
provide an indication of the device capability to the second wireless device, the device capability corresponding to a non-communication service of the non-communication services and the indication identifying the first wireless device provides the device capability via the intermediary wireless device.

18. The intermediary wireless device of claim 16, wherein the processor is further configured to cause the intermediary wireless device to:
provide an indication of the device capability to the second wireless device, the indication identifying the intermediary wireless device provides the device capability without identifying the first wireless device to the second wireless device.

19. The intermediary wireless device of claim 14, wherein the processor is further configured to cause the intermediary wireless device to:
receive results from the first wireless device based at least in part on data transferred to the first wireless device from the second wireless device via the intermediary wireless device; and
forward the results received from the first wireless device to the second wireless device.

20. A non-transitory computer-readable medium storing instructions that, when executed by a processor of an intermediary wireless device, cause the intermediary wireless device to:
request, from a first wireless device via a first wireless connection established between the intermediary wireless device and the first wireless device, profile information identifying one or more capabilities of the first wireless device, the one or more capabilities including at least one non-communication service associated with the first wireless device, wherein the at least one non-communication service differs from an authentication service;
receive, from the first wireless device via the first wireless connection, the profile information;
establish a second wireless connection between the intermediary wireless device and a second wireless device; and
transfer, based at least in part on the received profile information, data between the first wireless device and the second wireless device via the first wireless connection and via the second wireless connection, wherein the data corresponds to the non-communication service.

* * * * *